(12) United States Patent
Nousiainen et al.

(10) Patent No.: US 6,422,712 B1
(45) Date of Patent: Jul. 23, 2002

(54) USER-INTERFACE ILLUMINATOR

(76) Inventors: Jaako Nousiainen, Rummunlyojankatu 20 A 6, FIN-24100 Salo; Terho Kaikuranta, Sorvakuja 7, 20760 Piispanristi, both of (FI)

( * ) Notice: Subject to any disclaimer, the term of this patent is extended or adjusted under 35 U.S.C. 154(b) by 0 days.

(21) Appl. No.: 09/406,078

(22) Filed: Sep. 27, 1999

(51) Int. Cl.[7] .................................................. F21V 7/04
(52) U.S. Cl. ........................ 362/31; 362/555; 362/560; 362/561; 362/551; 362/346; 362/26; 362/297
(58) Field of Search .................... 362/31, 555, 560, 362/561, 551, 346, 297, 26

(56) References Cited

U.S. PATENT DOCUMENTS 4,914,553 A * 4/1990 Hamada et al. ............... 362/32
5,053,928 A * 10/1991 Pasco .......................... 362/31
5,197,792 A    3/1993 Jiao et al.
5,872,527 A *  2/1999 Yanagisawa ................. 341/22
6,160,948 A * 12/2000 McGaffigan ................ 385/901

FOREIGN PATENT DOCUMENTS

EP          0884525 A     12/1998

* cited by examiner

*Primary Examiner*—Sandra O'Shea
*Assistant Examiner*—Bertrand Zeade
(74) *Attorney, Agent, or Firm*—Robert C. Rolnik

(57) ABSTRACT

A light guide is disclosed having a critical angle, wherein light enters the light guide in an input direction. A reflector reflects light using total internal reflection in a lateral direction. A second reflector reflects light using total internal reflection in a second lateral direction. A third reflector reflects light from the lateral direction upward. A fourth reflector reflects light from the second lateral direction upward.

32 Claims, 4 Drawing Sheets

USER-INTERFACE ILLUMINATOR

FIELD OF THE INVENTION

This invention relates generally to illuminating controls or output devices of user interfaces, and more particularly, to using internal reflection to guide light from a source to a surface.

BACKGROUND OF THE INVENTION

Electronic devices have, in recent years pervaded our society. Driven by new technologies such as calculators, GPS, cellular, remote key-less entry, the industry has spawned a myriad of core device-types. The nature of competition has caused some of these devices to take on additional functionality, and occasionally a convergence of multiple functionalities. The result is, in order to power a multifunction device, conservation of power must be done in a clever way. Unfortunately, the use of LEDs, or illuminated user interfaces in general (e.g. push buttons, back and frontlit LCDs) causes a significant drain on the power source available to such multifunction devices.

Manufacture of electronics devices, particularly those having a quantity of buttons, has been a constant struggle to reduce part-counts. While the older plastic keypads have largely given way to monolithic rubber membranes, a new collection of parts has evolved to supply night time illumination of and through such buttons, namely individual LEDs to match each button. The additional parts increase the costs of manufacture and diminishes the reliability of such illuminated devices.

One of the big costs in terms of using e.g. a lambertian emitting LED to illuminate any part of a user interface, is the fact that only a small fraction of the power provided electrically to the LED actually transfers to optical power. Moreover, guiding this optical power efficiently to the area which is to be illuminated is very difficult. Instead, the LED illuminates through a range of angles that cast light on a large swatch of the interior of the device—light that is generally wasted. This effect is more pronounced as the LED source is placed farther from the button or LCD that the LED is supposed to illuminate. The diminution of illumination is generally proportional with an inverse of the square of the distance between the illuminating source and the illuminated interface.

SUMMARY OF THE INVENTION

According to an embodiment of the present invention, a more efficient single light source with a improved conversion of electrical power to optical power replaces the use of multiple LEDs to achieve a higher energy conversion and corresponding lower power consumption. By using a collimated light beam and using total internal reflection to guide the beam and branches of the beam to viewing surfaces, the total electrical-optical power efficiency of the embodiment is dramatically higher than current solutions. A manufacturer has fewer components to purchase, maintain quality on, and assemble. Also weight, size, volume, number or required electrical connections, etc. may be reduced. The outcome is that inventories are smaller, and manufacturing defects are diminished also increasing reliability. Also, fewer conductive traces are needed to carry electricity to remote parts of the user-interface, resulting in fewer opportunities for defects and failures during manufacturing or use caused by open circuits or short circuits.

An object and advantage of the invention is that the optical power emitted by a light source is propagated through a medium and reflected to illuminate a generally flat area to provide high visibility of silhouetted button markings and LCDs, among others. An attendant advantage is that the generally flat area may have an irregular perimeter.

Another object and advantage of the invention is a light source may be located at greater distances from its target without appreciable light leaking to unintended areas.

Another object and advantage of the invention is that a single light source may be directed to multiple targets without losses typically associated with reflection.

Still another object and advantage of the invention is that light may be provided through a structure that is thin as compared to either its height or length.

In another embodiment of the invention light is guided to a main output surface, and also to a secondary surface not coplanar with the main output surface.

BRIEF DESCRIPTION OF THE DRAWINGS

FIG. 4 is a distant full side view of a light guide according to an embodiment of the invention showing a closeup area enlarged in FIG. 4a;

DETAILED DESCRIPTION OF THE INVENTION

An embodiment of the invention may include a single light source, which may be a collimating light source or any light source provided with additional light collimating apparatus, and distribute the light to one or more user interfaces of a device. The distribution system or light guide takes advantage of a principle that permits light to be efficiently reflected at least once without requiring a surface having a reflective coating. The principle is total internal reflection and it depends upon a ray of light traveling through a medium being incident upon a surface of that medium at an angle greater than a critical angle of the medium. At angles less than the critical angle, most light passes through the surface, or refracts, thus diminishing the efficiency of guiding the light through the medium. The critical angle is always a measure of the incident angle as compared with a line that is normal to the surface. Twice the critical angle is the minimum arc between an incident ray and an outgoing ray wherein the outgoing ray has the same energy as the incident ray.

The embodiment may also take advantage of incidental reflections that occur when light is incident at angles approaching 90° to the normal of the surface. These incidental reflections, or grazing reflections, are commonly used by some types of optical fiber to carry light. The occurrence of such grazing reflections causes the reflected light to continue in substantially the same direction. Light that enters a sheet of transparent material having two broad parallel surfaces will tend to be carried through that sheet at substantially the same direction as when the light entered that sheet, so long as the light enters the sheet roughly parallel with the surfaces. A gentle curving of the sheet will tend to cause the light, after several grazing reflections, to curve with the sheet, much like a gentle curving of a fiber optic cable will cause the internal light of the fiber to follow the curve of the fiber. The light that passes through a sheet parallel to its broad surfaces is called laminar light, because it follows a direction lateral to the thickness of the sheet.

Figure 1A:
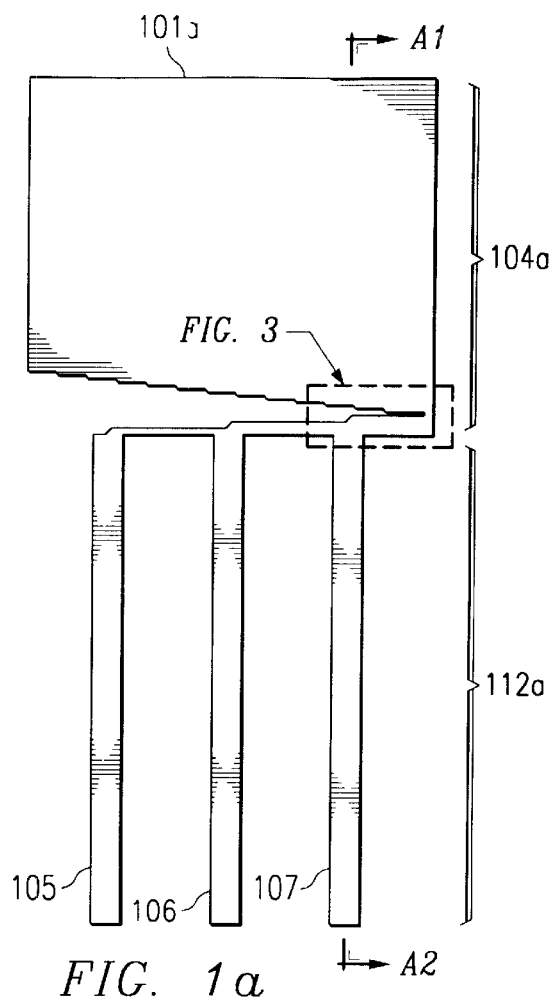
FIG. 1a is a top view of a light guide according to an embodiment of the invention.
Figure 1B:
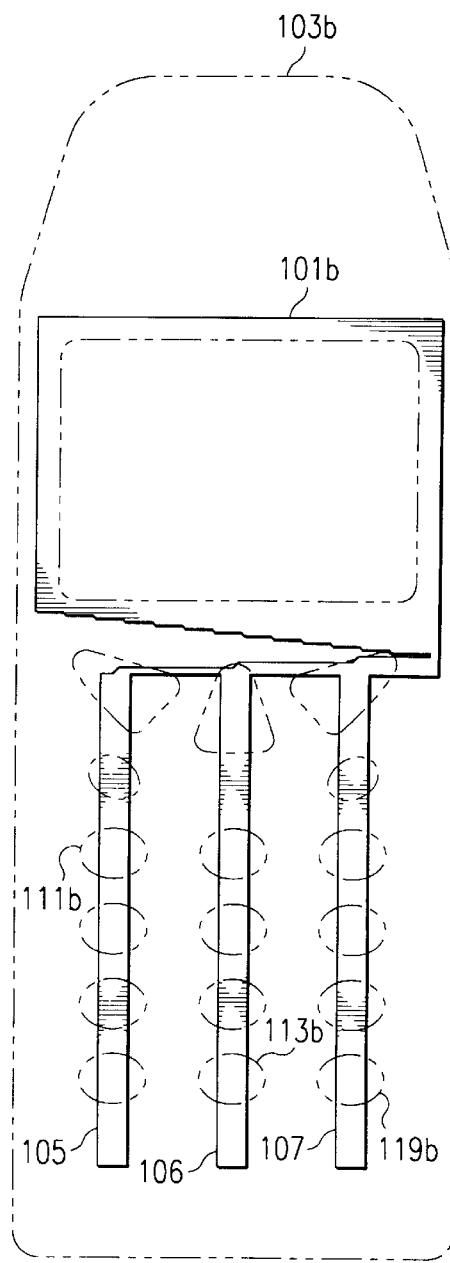
FIG. 1b is a mobile station cover superimposed over a light guide according to an embodiment of the invention.

FIG. 1a shows a sheet or light guide of a transparent material 101a that has been modified to cause sharp deviations by total internal reflection in the laminar flow of light through the light guide. The light may be sharply deviated in another lateral direction within the sheet. The light guide 101a is also shown with a typical device cover 103b superimposed on the light guide 101a. The device cover 103b shown is a mobile station cover for a combination keypad and display. The light guide 101a has a display area 104a and may have three keypad strips 105, 106, and 107. The keypad strips may be located under the button holes 111b, 113b, and 119b of the cover 103b. The sheet is generally flat on the output surface, however the sheet may have slight curvature. As will be shown, collimated light entering the light guide 101b laterally may exit through the output surface in 30 accordance with the embodiment.

Figure 2:
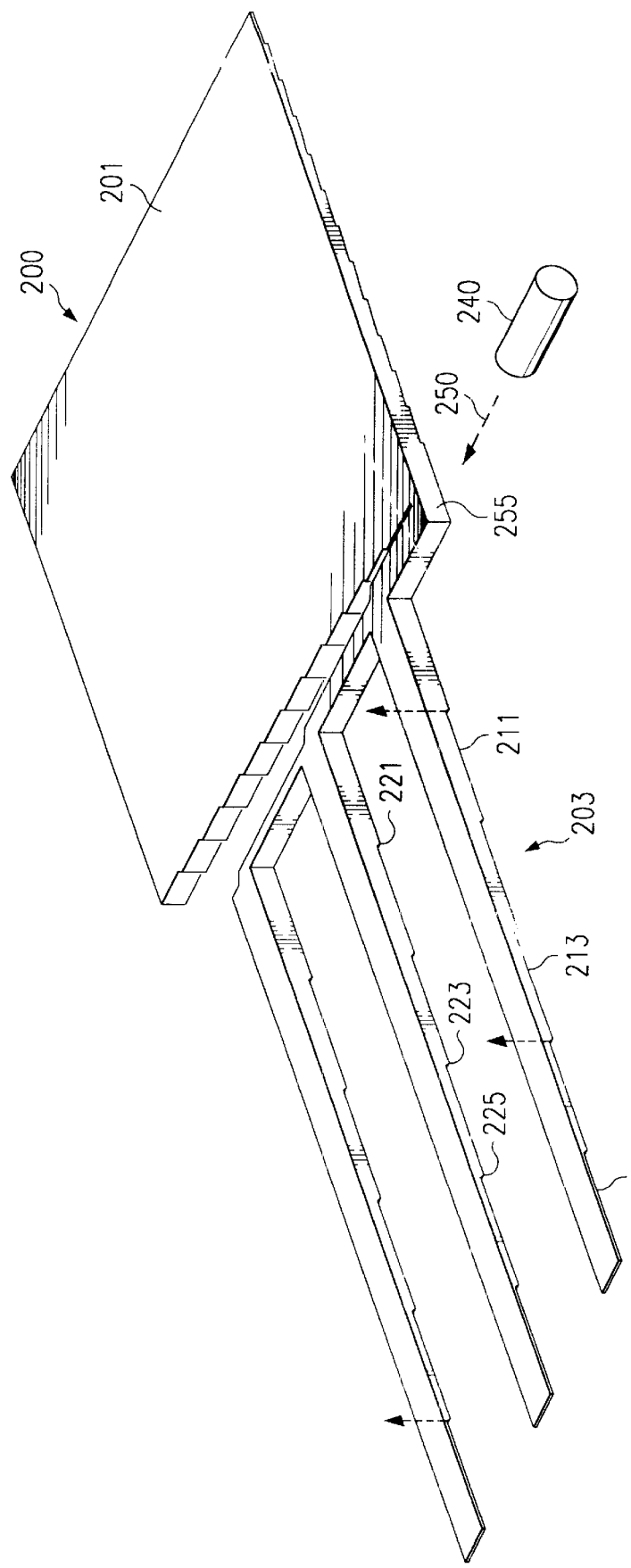
FIG. 2 is an oblique view of a light guide according to an embodiment of he invention.

FIG. 2 shows an oblique view of a light guide 200. The light guide 200 has a generally flat upper surface or output surface 201. The light guide 200 also has a lower surface 203 that includes a number of grazing surfaces 211, 213, 215 that are parallel to the nearby upper surface 201 also known as output surface, and a number of total internal reflector (TIR) surfaces or reflectors 221, 223, 225 that are at a significant angle to the nearby upper surface 201. The grazing surfaces 211, 213, 215 may predominate over the TIR surfaces in terms of the surface area of the lower surface 203. Collectively, the upper surface 201 and the grazing surfaces 211, 213, 215 are known as parallel surfaces, although some of the surfaces may curve slightly.

Light from a light source 240 may enter the light guide 200 following an input direction 250 at an input surface 255. Such light is traveling in a lateral direction, and may be reflected with a grazing reflection off of a parallel surface. The original beam that entered the light guide 200 and all grazing reflections are all considered to be travelling in the lateral direction. The light source 240 may be any light emitting device, e.g. a laser diode, high power LED, Vertical Cavity Surface Emitting Laser (VCSEL), or Resonant Cavity LED (RCLED).

Referring now to FIG. 1a, the light guide 101a, which may be the same as light guide 200, of the embodiment has a display component 104a and a keypad component 112a. The display component may undergird a LCD or other display that has a combination of transparent and opaque areas to represent output. The transmission of light through broad sections of the output surface (i.e. out of the page with respect to FIG. 1a) provides good low-light viewing of the superimposed display, which is a principal advantage of the embodiment. Similarly, a keypad button having a contrasting pattern of transparent arid opaque materials may be illuminated by a keypad strip, e.g. 105, 106 and 107 of FIG. 1a. Circuit closing mechanisms or other key-press sensing mechanisms may be mounted near the keypad strips 105, 106 and 107 so that each circuit closing mechanism receives the force of a depressed keypad button and provides an input signal to the device.

Figure 1C:
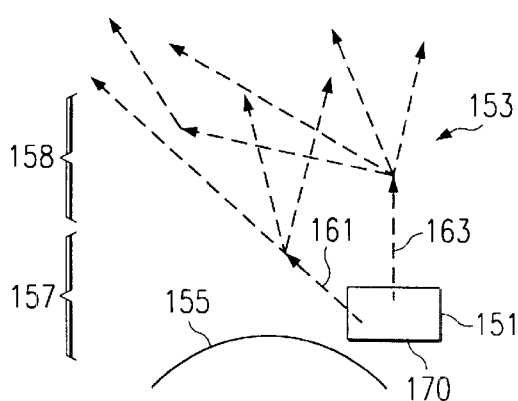
FIG. 1c is a cross sectional view across the width of a keypad strip, according to an embodiment of the invention.

FIG. 1C shows a cross-sectional view across the width of a keypad strip 151. A button 153 having some transparent sections is mounted in the direction of light reflection from the keypad strip 151. A key-press sensing mechanism 155 may be mounted below a button pillar 157, wherein the button pillar 157 may travel in a inward direction or travel direction to actuate the key-press sensing mechanism 155, wherein the button may avoid touching the keypad strip 151. The light may diffract and diffuse through the body of the button. A portion of the light passing in a lateral direction (which is into the page in FIG. 1C) along the length of the keypad strip 151 may be reflected by a TIR surface or reflector 170 in the direction 161 of the button pillar 157. A portion of the light passing in a lateral direction 321 along the length of the keypad strip 151 may be reflected by a TIR surface 170 in the direction 163 of the button body 158. A portion of the light passing in a lateral direction 321 along a length of the keypad strip 151 may be reflected by a TIR surface 170 in the direction 161 of the button pillar 157 and in the direction 163 of the button body 158. All directions in which light leaves the TIR surface 170, including the direction 161 of the button pillar 157 and the direction 163 of the button body 158 are egress directions.

Figure 3:
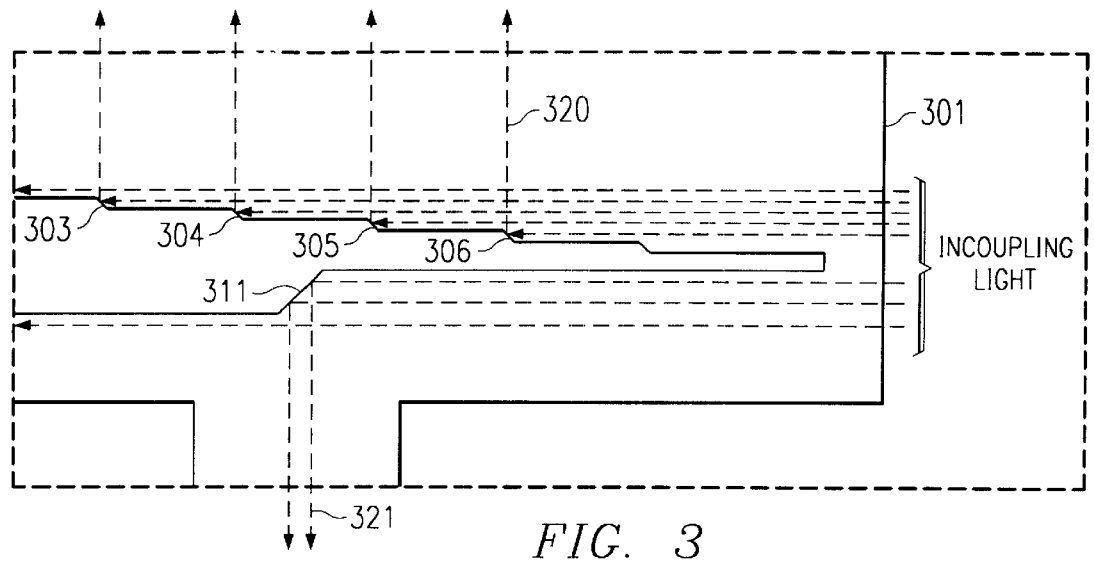
FIG. 3 is a close-up top view of a light guide according to an embodiment of the invention.

FIG. 3 shows a close-up top view of an embodiment of a light guide. The close-up view is of the area of FIG. 1a lying between the display component and the keypad component. Light enters at input surface 301, travelling in an input direction. TIR surfaces or reflectors 303, 304, 305 and 306 reflect light that is incident on TIR surfaces from the input direction in a first lateral direction 320 generally parallel with output surface 302. TIR surface 311 reflects light that is incident upon it from the input direction to a second lateral direction 321 generally parallel with output surface 302, but opposing in relation to the first lateral direction 320. In other words, the light from the input direction, to the extent that it is incident on TIR surfaces 303, 304, 305 and 306 and TIR surfaces 311, is divided between the part of the light guide that is on one side (e.g. the display side) of the input direction, and the part of the light guide that is on the other side (e.g. the button side) of the input direction. First lateral direction 320 is at least two times the critical angle different from the input direction. Second lateral direction 321 is at least two times the critical angle different from the input direction. TIR surfaces 303, 304, 305 and 306 may each be at a different orientation in relation to the input direction. Moreover, TIR surfaces 303, 304, 305 and 306 may each have a curvature so that all light reflected from the TIR surfaces does not travel in exactly the same direction. TIR surface 311 may be at a different orientation than any other TIR surface reflecting light in the second lateral direction 321. Moreover, TIR surface 311 may have a curvature so that all light reflected from the TIR surface 311 does not travel in exactly the same direction. The essential aspect of TIR surfaces 303, 304, 305 and 306 and TIR surface 311 is that the light that is reflected be travelling substantially in the plane of the light guide.

Figure 4:
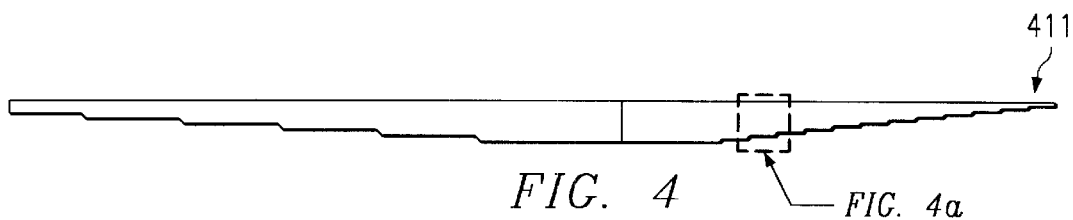
Figure 4A:
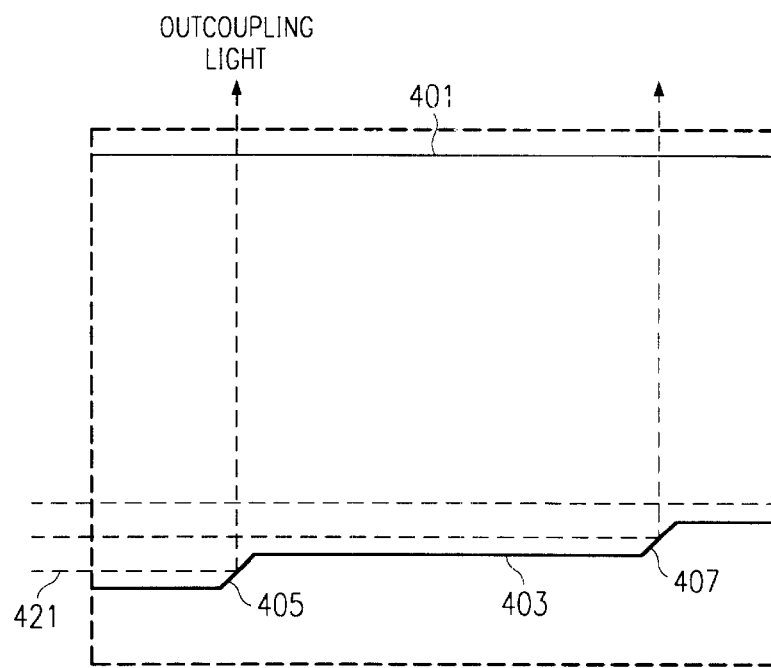
FIG. 4a is a close-up side view of a light guide according to an embodiment of the invention.

FIG. 4a is a close-up side equivalent to a cross section along a line A1–A2 of FIG. 1A., and particularly a view of light that is traveling in the first lateral direction 421 underneath the display component. The output surface 401 is flat, but may have a slight curvature to follow a gentle curve of a device cover. Output surface 401 may have a diffused surface or undergird a transparent diffusing sheet.

The advantage to this is to provide a larger viewing angle. TIR surfaces 403, 405 and 407 cause light incident upon them from the first lateral direction 421 to be reflected upward through the output surface 401. Note that an occasional grazing reflection between of the parallel surfaces does not cause a ray that is substantially parallel to the upper surface 401 to cease to be travelling in the first lateral direction 421. The TIR surfaces 403, 405 and 407 cause the light that is in the first lateral direction 421 to leave the plane that is encompassed by the input direction and the first lateral direction 421, i.e. the plane parallel to both the input direction and the first lateral direction wherein the input direction and the first lateral direction are in the plane. TIR surfaces 403, 405 and 407 may be oriented a few degrees different from each other, and may have a curvature to them so that all light that leaves their surfaces does not necessarily have to be travelling in the same direction. The essential aspect is that light that approaches from the first lateral direction be directed by total internal reflection upward through the output surface 401. The light guide has at least one tip 411, which may be arranged to reflect light, by means known in the art, to the direction from which it came.

Figure 4B:
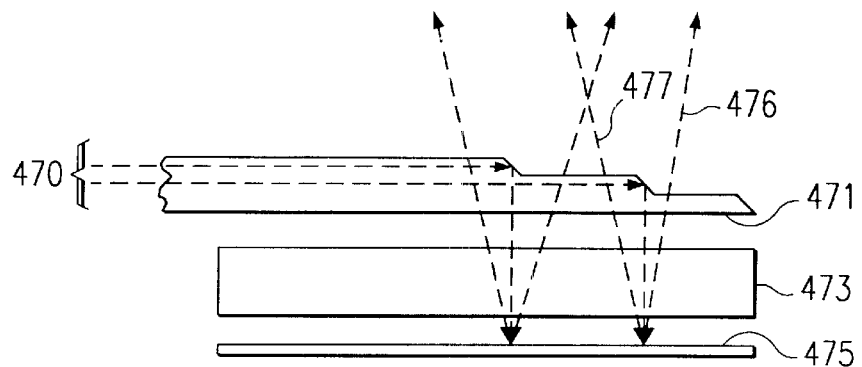
FIG. 4b is a close-up side view of a light guide according to another embodiment of the invention.

FIG. 4b shows a light guide arranged as a front light. Light from the output surface 471 passes through a display device 473, e.g. an LCD, to the extent that the display device 473 is controllably transparent in the area of light incidence. Light that passes through the display device 473 reflects off a diffusive reflector 475 arranged below the display device 473. The light may reflect in a conical pattern bounded by rays 476 and 477. Rays 476 and 477 pass through the display device 473, providing the display device is transparent at that location, and then through the light guide 470. Rays 476 and 477 may have some of their energy reflected multiple times from the various surfaces of the display device 473 and the light guide 470. The net result is the predominant share of the light passing out the output surface 471 is returned through the light guide to appear on surfaces 403, 405, 407, 408 and 409.

Figure 4C:
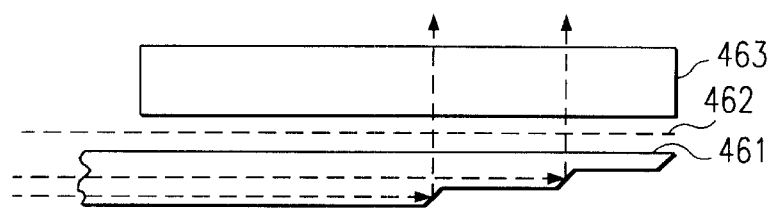
FIG. 4c is a close-up side view of a light guide according to yet another embodiment of the invention.
Figure 4D:
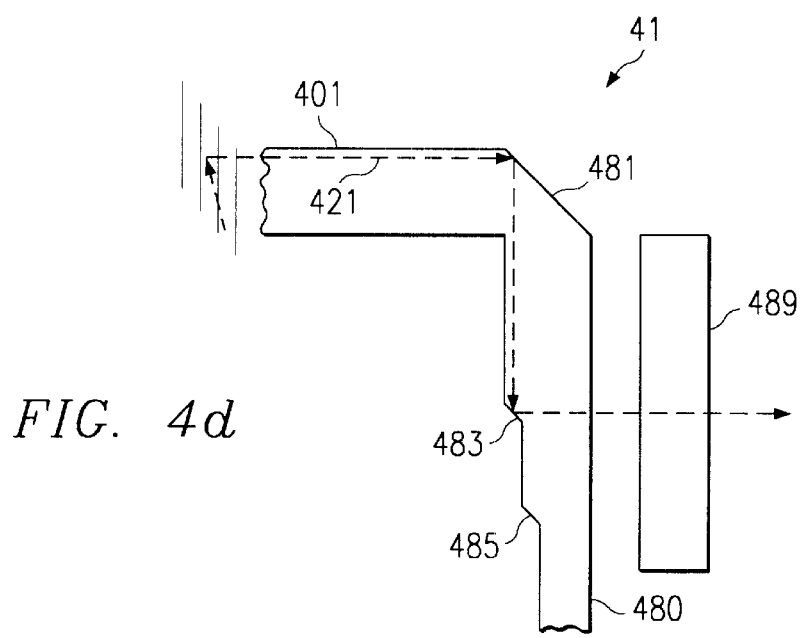
FIG. 4d is a close-up side view of a light guide according to still another embodiment of the invention.

FIG. 4c shows a light guide arranged as a back light. Light from the output surface 461 passes through a display device 463, e.g. an LCD, to be visible outside the device to the extent that the display device 473 is controllably transparent in the area of light incidence. A transparent diffusing sheet 462 may be interposed between the output surface 461 and the display device 463.

FIG. 4b shows a close-up cross-section of a tip 411 of the light guide according to another embodiment of the invention. In the event illumination is desired on a surface that has a markedly different orientation to the output surface 401, for example to go around a corner in the shape of the electronic device cover, otherwise known as a sharp discontinuity in the smoothness of the cover, a secondary output surface 480 may be provided for. Secondary TIR surface or reflector 481 may be disposed at the a tip 411 or any other end of the light guide that is carrying light in the lateral direction 421. Tertiary TIR surfaces or reflectors 483 and 485 may reflect the light through secondary output surface 480, and eventually through a secondary user interface 489, which may be a display or button.

Although the invention has been described in the context of particular embodiments, it will be realized that a number of modifications to these teachings may occur to one skilled in the art. Thus, while the invention has been particularly shown and described with respect to specific embodiments thereof, it will be understood by those skilled in the art that changes in form and configuration may be made therein without departing from the scope and spirit of the invention.

What is claimed is:

1. A light guide for guiding light received at an input having an input direction, said light guide having at least one output surface, said light guide comprising:
   a first at least one reflector reflecting said light received at said input in a first lateral direction from said input direction;
   a second at least one reflector reflecting said light received at said input in a second lateral direction wherein said second lateral direction is an opposing direction to said first lateral direction;
   a third at least one reflector reflecting said light reflected from said first at least one reflector out of a plane encompassing said input direction and said first lateral direction; and
   a fourth at least one reflector reflecting said light reflected from said second at least one reflector out of a plane encompassing said input direction and said second lateral direction.

2. The light guide for guiding a light of claim 1 further comprising a keypad button disposed near said fourth reflector.

3. The light guide for guiding a light of claim 2 further comprising a circuit closing mechanism disposed in a travel direction relative to said keypad button.

4. The light guide for guiding said light of claim 1 further comprising a diffusing surface above the output surface.

5. The light guide for guiding a light of claim 1 further comprising a LCD above the output surface.

6. The light guide for guiding a light of claim 5 further comprising a keypad button near the output surface and near the third at least one reflector.

7. The light guide for guiding a light of claim 6 further comprising a circuit closing mechanism in a travel direction relative to said keypad button.

8. The light guide for guiding a light of claim 1 further comprising at least one parallel surface reflecting light in said first lateral direction.

9. The light guide for guiding light of claim 1 further comprising a fifth at least one reflector reflecting said light from said fourth at least one reflector.

10. A light guide for guiding a light received at an input having an input direction, said light guide having at least one output surface, said light guide comprising:
    a first at least one reflector reflecting said light received at said input in a lateral direction;
    a second at least one reflector reflecting said light reflected from said first at least one reflector out of a plane encompassing said input direction and said lateral direction.

11. The light guide for guiding a light of claim 10 further comprising a keypad button disposed near said second at least one reflector and near the second at least one reflector.

12. The light guide for guiding a light of claim 11 further comprising a circuit closing mechanism in the direction of travel of said keypad button.

13. The light guide for guiding a light of claim 10 further comprising a diffusing surface above the output surface.

14. The light guide for guiding a light of claim 10 further comprising a LCD disposed over an output surface.

15. The light guide for guiding a light of claim 14 further comprising a keypad button disposed near said output surface.

16. The light guide for guiding a light of claim 15 further comprising a circuit closing mechanism in a travel direction relative to said keypad button.

17. The light guide for guiding a light of claim 10 further comprising at least one parallel surface reflecting light in said lateral direction.

18. The light guide for guiding light of claim 10 further comprising a third at least one reflector reflecting said light from said second at least one reflector.

19. A planar lighting system comprising:

a light source providing light in a first input direction;

a media having a critical angle, wherein light enters said media and travels in a second input direction, said media having an output surface substantially parallel to said second input direction, wherein said second input direction is substantially in the same direction as said first input direction;

a first at least one reflector reflecting said light in a first lateral direction; and a second at least one reflector reflecting said light from said first at least one reflector out of a plane encompassing said second input direction and said first lateral direction.

20. The planar lighting system of claim 19 where in the light source comprises a LED.

21. The planar lighting system of claim 19 where in the light source comprises a collimated light source.

22. The planar lighting system of claim 21 wherein the light source comprises a laser diode.

23. The planar lighting system of claim 21 wherein the light source comprises a VCSEL.

24. The planar lighting system of claim 21 wherein the light source comprises a RCLED.

25. The planar lighting system of claim 19 further comprising a keypad button disposed near second at least one reflector and near the third at least one reflector.

26. The planar lighting system of claim 25 further comprising a circuit closing mechanism in a travel direction relative to said keypad button.

27. The planar lighting system of claim 19 further comprising a diffusing surface above the output surface.

28. The planar lighting system of claim 19 further comprising a LCD disposed over an output surface.

29. The planar lighting system of claim 28 further comprising a keypad button disposed near said output surface.

30. The planar lighting system of claim 29 further comprising a circuit closing mechanism in a travel direction relative to said keypad button.

31. The planar lighting system of claim 19 further comprising at least one parallel surface reflecting light in said lateral direction.

32. The planar lighting system of claim 19 further comprising a third at least one reflector reflecting light from said second at least one reflector.

\* \* \* \* \*